US012244098B2

(12) United States Patent
Tang et al.

(10) Patent No.: US 12,244,098 B2
(45) Date of Patent: Mar. 4, 2025

(54) FEMALE CONNECTOR AND CONNECTOR ASSEMBLY

(71) Applicant: Tianjin Laird Technologies Limited, Tianjin (CN)

(72) Inventors: Jihai Tang, Tianjin (CN); Jingqi Zhao, Tianjin (CN); Yifan Xu, Tianjin (CN)

(73) Assignee: Tianjin Laird Technologies Limited, Tianjin (CN)

( * ) Notice: Subject to any disclaimer, the term of this patent is extended or adjusted under 35 U.S.C. 154(b) by 517 days.

(21) Appl. No.: 17/772,929

(22) PCT Filed: Dec. 7, 2020

(86) PCT No.: PCT/CN2020/134250
§ 371 (c)(1),
(2) Date: Jun. 22, 2022

(87) PCT Pub. No.: WO2021/083390
PCT Pub. Date: May 6, 2021

(65) Prior Publication Data

US 2022/0407265 A1 Dec. 22, 2022

(30) Foreign Application Priority Data

Oct. 28, 2019 (CN) ........................... 20191827621.1

(51) Int. Cl.
*H01R 13/6461* (2011.01)
*H01R 12/73* (2011.01)
(Continued)

(52) U.S. Cl.
CPC ......... *H01R 13/6461* (2013.01); *H01R 12/73* (2013.01); *H01R 13/11* (2013.01); *H01R 12/58* (2013.01)

(58) Field of Classification Search
CPC ........ H01R 12/73; H01R 12/58; H01R 13/11; H01R 13/6461
(Continued)

(56) References Cited

U.S. PATENT DOCUMENTS 4,030,792 A * 6/1977 Fuerst .................. H01R 12/585 439/82
5,934,934 A * 8/1999 Ward ................. H01R 13/6599 439/620.09
(Continued)

FOREIGN PATENT DOCUMENTS

CN 105392271 A 3/2016
CN 106211542 A 12/2016
(Continued)

OTHER PUBLICATIONS

PCT International Search Report and Written Opinion (and its English translation) for PCT/CN2020/134250 (WO2021083390) that is the parent application to the instant application; dated Mar. 1, 2021 (30 pages).

*Primary Examiner* — Harshad C Patel
(74) *Attorney, Agent, or Firm* — Harness, Dickey & Pierce, P.L.C.; Anthony G. Fussner

(57) ABSTRACT

The present disclosure provides a female connector and a connector combination. The female connector includes: a female terminal having a first end for mating with a male connector or a gold finger circuit board, and a second end for connection with a PCB board, the female terminal being formed with at least one shape abruptly-changed portion between the first end and the second end, and a high-frequency radiation area being formed in the vicinity of the shape abruptly-changed portion when the first end is mated with the male connector or the gold finger circuit board; and a wave-absorbing material disposed in a spatial range covered by the high-frequency radiation area. By selectively
(Continued)

disposing the wave-absorbing material in an area where a high-frequency radiation is easily generated during the use of the connector, crosstalk signals are absorbed, while normally transmitted electrical signals are retained, and an overall weight of the connector is light.

19 Claims, 9 Drawing Sheets

(51) Int. Cl.
*H01R 13/11* (2006.01)
*H01R 12/58* (2011.01)

(58) Field of Classification Search
USPC .......................................................... 439/877
See application file for complete search history.

(56) References Cited

U.S. PATENT DOCUMENTS

| | | | | | |
|---|---|---|---|---|---|
| 5,947,772 | A * | 9/1999 | Arnett | H01R 24/64 | 439/76.1 |
| 5,961,349 | A * | 10/1999 | Paagman | H05K 1/112 | 439/63 |
| 7,850,473 | B1 * | 12/2010 | Ozeki | H01R 12/79 | 439/260 |
| 7,883,369 | B1 * | 2/2011 | Sun | H01R 12/721 | 439/607.35 |
| 7,957,156 | B2 * | 6/2011 | Palomo | H01R 12/585 | 361/779 |
| 8,057,263 | B1 * | 11/2011 | Howard | H01R 12/721 | 439/631 |
| 8,142,207 | B1 * | 3/2012 | Ljubijankic | H01R 13/6473 | 439/95 |
| 8,177,564 | B1 * | 5/2012 | Ito | H01R 13/6471 | 439/108 |
| 9,472,900 | B1 | 10/2016 | Phillips et al. | | |
| 9,531,130 | B1 * | 12/2016 | Phillips | H01R 13/6471 | |
| 9,570,824 | B1 * | 2/2017 | Chien | H01R 12/724 | |
| 9,768,557 | B2 * | 9/2017 | Phillips | H01R 13/6585 | |
| 9,871,325 | B2 | 1/2018 | Patel et al. | | |
| 10,431,932 | B1 * | 10/2019 | Zhang | H01R 12/724 | |
| 10,686,282 | B1 * | 6/2020 | McCarthy | H01R 13/6471 | |
| 10,944,189 | B2 * | 3/2021 | Xu | H01R 12/75 | |
| 2012/0190219 | A1 * | 7/2012 | Pai | H01R 12/721 | 439/65 |
| 2016/0324001 | A1 | 11/2016 | Zhai et al. | | |
| 2016/0336691 | A1 | 11/2016 | de Boer | | |
| 2017/0006698 | A1 | 1/2017 | Huang et al. | | |
| 2017/0207579 | A1 * | 7/2017 | Patel | H05K 1/117 | |
| 2019/0173209 | A1 * | 6/2019 | Lu | H01R 12/716 | |
| 2020/0036122 | A1 * | 1/2020 | Feng | H01R 13/6473 | |
| 2020/0099149 | A1 | 3/2020 | Xu et al. | | |
| 2020/0266584 | A1 * | 8/2020 | Lu | H01R 12/75 | |
| 2021/0234290 | A1 * | 7/2021 | Dunham | H01R 12/714 | |
| 2021/0320461 | A1 * | 10/2021 | Buck | H01R 12/62 | |

FOREIGN PATENT DOCUMENTS

| | | | |
|---|---|---|---|
| CN | 107017526 | A | 8/2017 |
| CN | 107069264 | A | 8/2017 |
| CN | 107069266 | A | 8/2017 |
| CN | 208256947 | U | 12/2018 |
| CN | 208862209 | U | 5/2019 |
| CN | 111029857 | A | 4/2020 |
| CN | 210535884 | U | 5/2020 |
| CN | 210535947 | U | 5/2020 |
| CN | 210692927 | U | 6/2020 |
| CN | 210897863 | U | 6/2020 |
| EP | 1606859 | B1 | 2/2007 |

* cited by examiner

D-D

FEMALE CONNECTOR AND CONNECTOR ASSEMBLY

CROSS-REFERENCE TO RELATED PATENT APPLICATION

This patent application is a U.S. national stage filing under 35 U.S.C. § 371 of PCT International Application No. PCT/CN2020/134250 filed Dec. 7, 2020 (published as WO2021/083390 on May 6, 2021), which claims priority to and the benefit of Chinese patent application with an application number of 201921827621.1 filed on Oct. 28, 2019. The entire contents of these applications are incorporated herein by reference in their entirety.

FIELD

The present disclosure relates to a technical field of connectors, and particularly to a female connector, and a connector combination formed by the mating of the female connector with a male connector or a gold finger circuit board.

BACKGROUND

Connectors are widely used in the electronic field. With the rapid development of the big data, the 5G technology and the artificial intelligence applications, the connector must meet the requirements of high-speed and high-density applications, which brings challenges to the signal integrity design of the connector, especially how to solve the problem of the crosstalk of differential signals under a high frequency/high density.

Usually, there are two traditional solutions: one is to shield a certain pair of differential signals or differential signals on a certain column in the connector by wrapping the connector with metal materials and electroplated plastic materials; and the other is to connect the grounding pins of each pair of differential signals, for example through electrically conductive plastic or metal, using a grounding improvement method. The traditional design method uses too many shielding materials and grounding materials, which leads to negative effects such as an increased connector weight and a large plugging force. Meanwhile, it is very difficult for the traditional methods to further realize a higher differential density.

In addition to the above two methods, in order to solve the problem of the crosstalk of the differential signal under the high frequency/high density, the connector or the conductor/conductor pair may be wrapped with a wave-absorbing material. The wave-absorbing material is used to eliminate the crosstalk of differential signals through the absorption effect of the wave-absorbing material on electromagnetic waves. However, there is a problem in the traditional way of wrapping with the wave-absorbing material, i.e. the wave-absorbing material absorbs electromagnetic waves non-selectively, so that the wave-absorbing material entirely wrapping the connector absorbs the crosstalk electromagnetic waves of the differential signals while absorbing the normally transmitted electrical signals. As a result, it is easier to destroy the signal integrity of the connector.

SUMMARY

Embodiments of the present disclosure provide a female connector, and a connector combination formed by the mating of the female connector with a male connector or a gold finger circuit board. By disposing a wave-absorbing material in an area where a high-frequency radiation is easily generated during the use of the connector, the embodiments of the present disclosure realize the selectivity and the pertinence for the wave-absorbing material to absorb electromagnetic waves, thereby not only absorbing crosstalk signals of differential signals, but also keeping normally transmitted electrical signals. Thus, the signal integrity of the connector is guaranteed, and the overall weight of the connector is light.

In order to achieve the above objective, the present disclosure provides the following technical solutions.

A female connector, including: a female terminal having a first end for mating with a male connector or a gold finger circuit board, and a second end for connection with a PCB board, the female terminal being formed with at least one shape abruptly-changed portion between the first end and the second end, and a high-frequency radiation area being formed in the vicinity of the shape abruptly-changed portion when the first end is mated with the male connector or the gold finger circuit board; and a wave-absorbing material disposed in a spatial range covered by the high-frequency radiation area.

A connector combination, including a male connector and a female connector, the male connector includes a male terminal, and the female connector includes: a female terminal having a first end for mating with the male terminal and a second end for connection with a PCB board, the female terminal forming at least one shape abruptly-changed portion between the first end and the second end, and a high-frequency radiation area being formed in the vicinity of the shape abruptly-changed portion when the first end is mated with the male terminal; and a wave-absorbing material disposed in a spatial range covered by the high-frequency radiation area.

A connector combination, including a gold finger circuit board and a female connector, the gold finger circuit board has a gold finger insertion tip, and the female connector includes: a female terminal having a first end for mating with the gold finger insertion tip and a second end for connection with a PCB board, the female terminal being formed with at least one shape abruptly-changed portion between the first end and the second end, and a high-frequency radiation area being formed in the vicinity of the shape abruptly-changed portion when the first end is mated with the gold finger insertion tip; and a wave-absorbing material disposed in a spatial range covered by the high-frequency radiation area.

In the embodiments of the present disclosure, it is creatively discovered and found out that a high-frequency radiation area can easily occur due to an abrupt change of the shape of the female terminal during the use of the connector, and practices show that the wave-absorbing material only needs to be disposed in the high-frequency radiation area rather than other areas without a high-frequency radiation. By selectively or pertinently disposing the wave-absorbing material, signals are also selectively absorbed by the wave-absorbing material. That is, only crosstalk signals are absorbed without affecting normal signals, so that the integrity of differential signals can be well ensured.

In addition, the way of selectively or pertinently disposing a wave-absorbing material in a high-frequency radiation area is adopted to replace the way of entirely wrapping (a plastic bracket and a shell) with a wave-absorbing material in the prior art, so as to overcome the signal crosstalk without using any additional shielding material, which not only greatly reduces the use amount of the wave-absorbing material, as well as an overall weight and costs of consumables and process implementation of the connector, but also helps in improving the density of differential pairs, and meeting the application requirements of high-speed and high-density connectors in the current technical development.

BRIEF DESCRIPTION OF THE DRAWINGS

FIG. 3G' is a structural schematic diagram of a cross-section C-C in FIG. 3G;

FIG. 3H' is a structural schematic diagram of a cross-section D-D in FIG. 3H;

FIG. 3I' is a structural diagram of a cross-section E-E in FIG. 3I;

DETAILED DESCRIPTION

In order to make persons in this technical field better understand the technical solutions in the present disclosure, the technical solutions of the embodiments of the present disclosure will be clearly and completely described below with reference to the drawings for the embodiments of the present disclosure. Obviously, those embodiments described are only a part, rather than all, of the embodiments of the present disclosure. Based on the embodiments in the present disclosure, any other embodiments obtained by those of ordinary skills in the art without paying any creative labor should fall within the protection scope of the present disclosure.

It should be noted that when an element is referred to as being 'disposed on' another element, it may be directly on another element or there may be an intermediate element. When an element is considered as being 'connected to' to another element, it may be directly connected to another element or there may be an intermediate element. The terms 'vertical', 'horizontal', 'left', 'right' and similar expressions used herein are for illustration purposes only, and are not intended to indicate a unique embodiment.

Unless otherwise defined, all of the technical and scientific terms used herein have the same meanings commonly understood by a person skilled in the technical field of the present disclosure. The terms used in the specification of the present disclosure are only for the purpose of describing specific embodiments, and are not intended to limit the present disclosure. As used herein, the term 'and/or' includes any and all combinations of one or more related listed items. In addition, in the description of the present application, 'a plurality of' means two or more unless otherwise stated.

Figure 1:
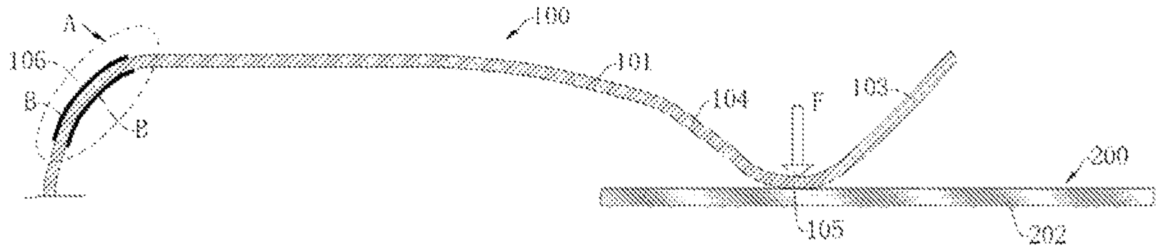
FIG. 1 is a structural schematic diagram of a connector combination formed by the mating of a female connector and a male connector according to a first non-limiting embodiment of the present disclosure.
Figure 2:
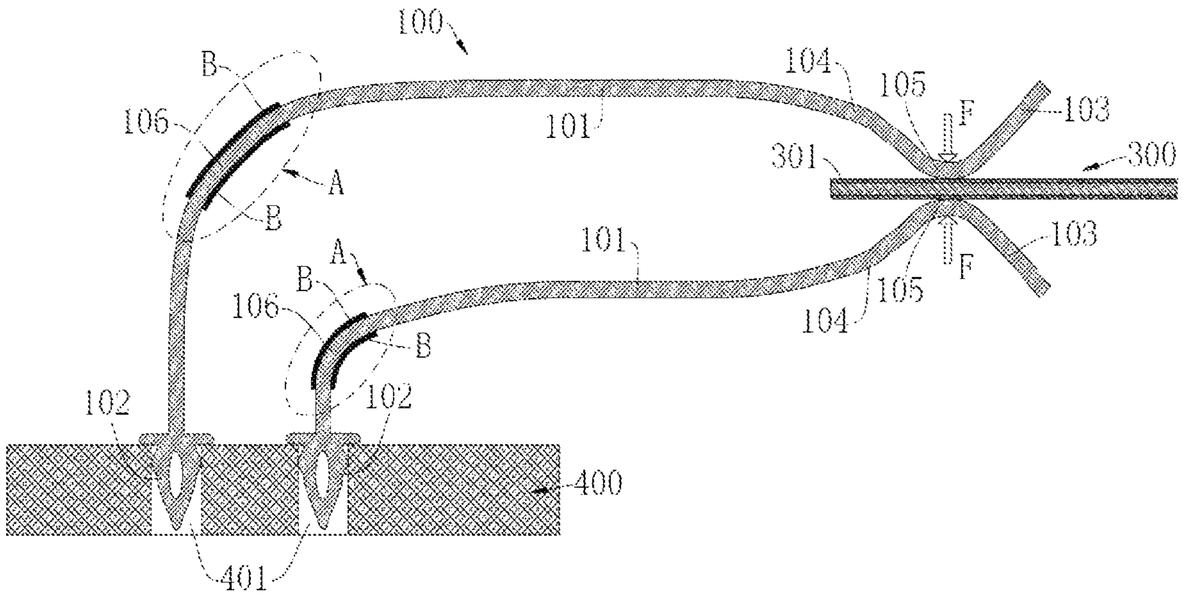
FIG. 2 is a structural schematic diagram of a connector combination formed by the mating of a female connector and a gold finger circuit board according to a first non-limiting embodiment of the present disclosure.

As illustrated in FIGS. 1 and 2, embodiments of the present disclosure provide a female connector 100, and a connector combination formed by the mating of the female connector 100 with a male connector 200 or a gold finger circuit board 300.

The female connector 100 includes a female terminal 101 for mating with the male connector 200 or the gold finger circuit board 300. The female terminal 101 has two opposite ends, i.e. a first end (a right end as illustrated in FIGS. 1 and 2) for mating with the male connector 200 or the gold finger circuit board 300, and a second end (a lower end as illustrated in FIGS. 1 and 2) facing away from the first end for electrical connection with a PCB board 400.

As illustrated in FIG. 2, the second end of the female terminal 101 may be electrically connected to the PCB board 400 by plugging. Specifically, the second end of the female terminal 101 forms a crimping pin 102 capable of an elastic contractable deformation, and the PCB board 400 is provided with a through hole or blind hole 401. The second end is inserted into the through hole or blind hole 401, and the crimping pin 102 undergoes a radial elastic contractable deformation and abuts against an inner wall of the through hole or blind hole 401 to achieve an interference fit.

Of course, the above is only one possible way to electrically connect the female terminal 101 with the PCB board 400, and any other way is also feasible, which is not limited herein. For example, the second end of the female terminal 101 is bent to form a soldering connection portion which is soldered with a pad on a surface of the PCB board 400, so as to achieve an electric connection therebetween.

In order to make the male connector 200 or the gold finger circuit board 300 successfully mate with the female connector 100, the first end of the female terminal 101 may be expanded radially outward to form a trumpet-shaped guide head 103 for blind mating between the male connector 200 or the gold finger circuit board 300 and the female connector 100. In this way, an operator can hold the male connector 200 or the gold finger circuit board 300 to successfully complete a mating operation with the female connector 100 under the guidance of the trumpet-shaped guide head 103.

In addition, in order to ensure a good electrical connection between the male connector 200 or the gold finger circuit board 300 and the female connector 100 after the mating, the female terminal 101 includes an elastic cantilever section 104, which is bent at at least one position to form elastic pressing portions 105 for an interference fit contact with the male connector 200 or the gold finger circuit board 300. In this embodiment, one of the elastic pressing portions 105 is disposed close to the trumpet-shaped guide head 103.

The cantilever section 104 has a preset length, so as to have an elastic force F for unidirectionally pressing/bidirectionally clamping the male connector 200 or bidirectionally clamping the gold finger circuit board 300. As illustrated in FIG. 2, the gold finger circuit board 300 is bidirectionally clamped by the elastic pressing portions 105 formed on the cantilever sections 104. Since the gold finger circuit board 300 is bidirectionally clamped by the elastic pressing portions 105, the gold finger circuit board 300 comes into a single-point contact with the single female terminal 101, thereby realizing a better mating between the gold finger circuit board 300 and the female terminal 101.

In this embodiment, there may be only one elastic pressing portion 105 formed on the cantilever section 104. At this time, the mating between the gold finger circuit board 300 and the female connector 100 is in a case of male connector being straight and female connector being bent.

Since the bending performance of the traditional gold finger circuit board 300 is poor, the gold finger circuit board 300 in this embodiment can adopt the straight male connector of the prior art. However, with the development of technologies, the bendable or flexible gold finger circuit board 300 is gradually used. It is feasible that the gold finger circuit board 300 is prepared in a bent or flexed shape. Therefore, this embodiment does not exclude a case of male connector being bent and female connector being bent for the mating between the gold finger circuit board 300 and the female connector 100.

In the embodiment illustrated in FIG. 1, it is the case where the female terminal 101 presses a male terminal 202 of the male connector 200 unidirectionally. In which, the female terminal 101 and the male terminal 202 of the male connector 200 may be mated through a single-point contact under the condition that the female terminal 101 can contact well with the male terminal 202 of the male connector 200. At this time, the mating between the male connector 200 and the female connector 100 is in a case of male connector being straight and female connector being bent.

Of course, the female terminal 101 and the male terminal 202 of the male connector 200 may also be mated through a two-or-more-point contact, i.e., at this time, two or more elastic pressing portions 105 are formed on the cantilever section 104 of the female terminal 101, and two or more elastic fitting portions are also formed on the male terminal 202. The two or more elastic fitting parts and the two or more elastic pressing portions 105 contact to realize the two-or-more-point contact between the male terminal 202 and the female terminal 101. At this time, the mating between the male connector 200 and the female connector 100 is in a case of male connector being bent and female connector being bent.

Following the above description, the first end of the female terminal 101 is configured to mate with the male connector 200 or the gold finger circuit board 300, and the second end thereof is to be connected to the PCB board 400. However, under the influences of the size and volume of the space, the mating direction with the male connector 200 or the gold finger circuit board 300, the position for disposing the PCB board 400, etc., the female terminal 101 usually needs to be bent to adapt to its assembly. Thus, not only the mating with the male connector 200 or the gold finger circuit board 300 and the disposal of the PCB board 400 is achieved, but also the overall length of the female terminal 101 is reduced, thereby realizing the arrangement in the limited space. Alternatively, it is difficult for the female terminal 101 to strictly keep the consistency of its cross-sectional shape, so that the cross-sectional area may be changed in some places. As a result, at least one shape abruptly-changed portion 106 is formed in the female terminal 101 between the first end and the second end.

Therefore, in this embodiment, the shape abruptly-changed portion 106 may mainly include two situations, i.e. the female terminal 101 is bent (i.e., as illustrated in FIGS. 3A to 3L) or the cross-sectional area of the female terminal 101 is changed. In which, the female terminal 101 is bent, so that the surface of the female terminal 101 is no longer straight, but bent and deformed. Further, a bending angle at which the female terminal 101 is bent may be set according to the actual situation, mainly depending on the mating direction with the male connector 200 or the gold finger circuit board 300 and an arrangement orientation of the PCB board 400. In other words, the bending angle may depend on the relative positions of the two ends of the female terminal 101. Thus, the bending angle is not limited herein.

For example, in the embodiments illustrated in FIGS. 3A to 3L, the female terminal 101 is bent by a smooth transition, which can reduce the high-frequency radiation intensity caused by the bending of the female terminal 101. Alternatively, in the embodiments illustrated in FIGS. 3J to 3L, the female terminal 101 may be bent at an angle. Specifically, in the embodiment illustrated in FIG. 3J, the female terminal 101 is bent at a several (e.g., two) places with bending angles greater than 90° and less than 180°. Alternatively, in the embodiments illustrated in FIGS. 3K and 3L, the female terminal 101 is bent at only one place, with a bending angle of 90° or more than 0° but less than 90°. In which, the bending angle less than 90° belongs to a case where the shape of the female terminal 101 is abruptly changed. In addition, the shape is changed more abruptly as the bending angle decreases.

The cross-sectional area may be an area of a cross-section perpendicular to a signal flow direction in the female terminal 101, and specifically, an area of a cross-section perpendicular to a paper plane direction illustrated in each of FIGS. 3A to 3L. Further, the change of the cross-sectional area may include the following situations: the cross-sectional area of the female terminal 101 increases or decreases in a direction from the first end to the second end, a convex structure is formed on the surface of the female terminal 101, and a hole structure is formed in the female terminal 101. Since the female terminal 101 is substantially flat, signals can be transmitted on the flat surface. Thus, the increase or decrease of the cross-sectional area of the female terminal 101 may indicate that the signal transmission path becomes wider or narrower. In this embodiment, if the female terminal 101 has a constant thickness, the increase or decrease of the cross-sectional area of the female terminal 101 may indicate that the dimension of the female terminal 101 perpendicular to the paper plane direction illustrated in each of FIGS. 3A to 3L increases or decreases. If the convex structure is formed on the surface of the female terminal 101, it may indicate that the cross-sectional area of the female terminal 101 increases, and if the hole structure is formed in the female terminal 101, it may indicate that the cross-sectional area of the female terminal 101 decreases.

After the female connector 100 is mated with the male connector 200 or the gold finger circuit board 300, a differential signal may be transmitted from one end to the other end (the first end→the second end, or the second end→the first end). Inside the female connector 100, the transmission of the differential signal depends on the female terminal 101, and specifically, the differential signal is transmitted via the surface of the female connector 100. However, after a long-term study, the inventor of the present disclosure finds that in a high-frequency operation condition, the induced electromagnetic field and the coupling phenomenon are intensified at a position on the female terminal 101 where the shape abruptly-changed portion 106 is formed, and the signals are easily clustered and gathered at the shape abruptly-changed portion 106, thereby forming a high-frequency radiation area A in the vicinity of the shape abruptly-changed portion 106. The existence of the high-frequency radiation area A will greatly interfere with the differential signal transmitted via the shape abruptly-changed portion 106 and its vicinity.

As described above, in order to solve the problem of the crosstalk of differential signals, the wave-absorbing material may be used to absorb the crosstalk signals, and specifically, the connector is entirely wrapped with the wave-absorbing material. However, the way of full wrapping with the wave-absorbing material will lead to an undifferentiated signal absorption, which is even more detrimental to the integrity of the differential signal. In addition, the full wrapping with the wave-absorbing material will increase the overall weight of the connector, and consume a lot of wave-absorbing materials, so the costs of consumables and process implementation are high.

In view of this, after long-term field practices, the inventor of the present disclosure finds that the above problem can be well solved by pertinently disposing a wave-absorbing material B in an area A where the high-frequency radiation is likely to occur due to the antenna effect, while not disposing the wave-absorbing material B in other areas where no high-frequency radiation occurs. In this embodiment, the first wave-absorbing material B is disposed in a spatial range covered by the high-frequency radiation area A.

Since the wave-absorbing material B is selectively or pertinently disposed in the spatial range covered by the high-frequency radiation area A, the wave-absorbing material B can absorb the crosstalk signal on the one hand, without affecting the normal differential signal transmitted via the shape abruptly-changed portion 106, thereby ensuring the integrity of the differential signal. On the other hand, the wave-absorbing material B is only disposed in the spatial range covered by the high-frequency radiation area A, and a use amount thereof is small, so that the female connector 100 of this embodiment is lighter in weight and lower in cost compared with the connector entirely wrapped by the wave-absorbing material B in the prior art.

In this embodiment, the spatial range covered by the high-frequency radiation area A is a virtual space, which may be centered at the shape abruptly-changed portion 106, and expanded outward in a radial or spherical shape in a three-dimensional space. Actually, the size or dimension of the spatial range covered by the high-frequency radiation area A is related to many factors, such as a signal intensity, a material of the female terminal 101, a bent degree of the shape abruptly-changed portion 106, a signal frequency, a resonance frequency, etc., which is not limited herein.

Thus, as long as the position for disposing the wave-absorbing material B falls within the spatial range covered by the high-frequency radiation area A, the specific position and way for disposing the wave-absorbing material B and the material form thereof may be relatively free and flexible. Generally, the wave-absorbing material B may support a wide frequency operation scope from 1 GHZ to 100 GHZ, and the material form may be solid (for example, including but not limited to, layer, sheet, film, block, plate, strip, cylinder), liquid, powder and plastic particles, etc., and the disposing way may be adopted according to the different material forms to adapt to different occasions, including but not limited to, adhesion, hot melting, electroplating, brushing, painting, filling, injection molding, etc. Therefore, the wave-absorbing material B may be customized according to the signal frequency, the resonance frequency, etc., to improve the application range of the technical solution of this embodiment.

For example, in a feasible embodiment, the wave-absorbing material B may be directly disposed on the shape abruptly-changed portion 106 and wrap at least part of an outer surface thereof. Specifically, as illustrated in FIGS. 3A to 3I', for example in a case where the female terminal 101 is bent at the shape abruptly-changed portion 106, the shape abruptly-changed portion 106 has an inner surface inside a bent corner and an outer surface outside the bent corner. The position for disposing the wave-absorbing material B may be only the inner surface of the shape abruptly-changed portion 106 (refer to the embodiment illustrated in FIG. 3B), or only the outer surface (refer to the embodiment illustrated in FIG. 3D), or both of the inner and outer surfaces (refer to the embodiment illustrated in FIG. 3E). The material form may include, but is not limited to, a coating layer, an adhesion layer or a film. In which, when the material form is a coating layer or a film, the wave-absorbing material B may be realized by a process such as spraying or electroplating; and when the material form is an adhesion layer, the wave-absorbing material B may be prepared into layers or sheets, and then stuck by viscose glue, or fixed by hot melting, etc. The size and the thickness of the coating layer, the adhesion layer or the film may be set according to the actual situation, and are not limited herein.

Described above is the embodiment where the wave-absorbing material B wraps part of the surface (the inner surface, or the outer surface, or both) of the shape abruptly-changed portion 106. Of course, when the wave-absorbing material B is disposed on the surface of the shape abruptly-changed portion 106, the wave-absorbing material B may further wrap the entire outer surface of the shape abruptly-changed portion 106. In the embodiments illustrated in FIGS. 3G and 3G', the cross-section of the shape abruptly-changed portion 106 is formed into a rectangle with four outer surfaces, which may be wrapped by the wave-absorbing material B. Of course, the shape of the cross-section of the wave-absorbing material B at the shape abruptly-changed portion 106 is not limited to the rectangle, and other shapes such as a circle, an ellipse, a polygon, a special shape, etc. are also possible, which are not limited herein. In this embodiment, the material form of the wave-absorbing material B may be the coating layer, the adhesion layer or the film, and the specific implementation may refer to the above description, which will not be repeated herein.

Figure 3A:
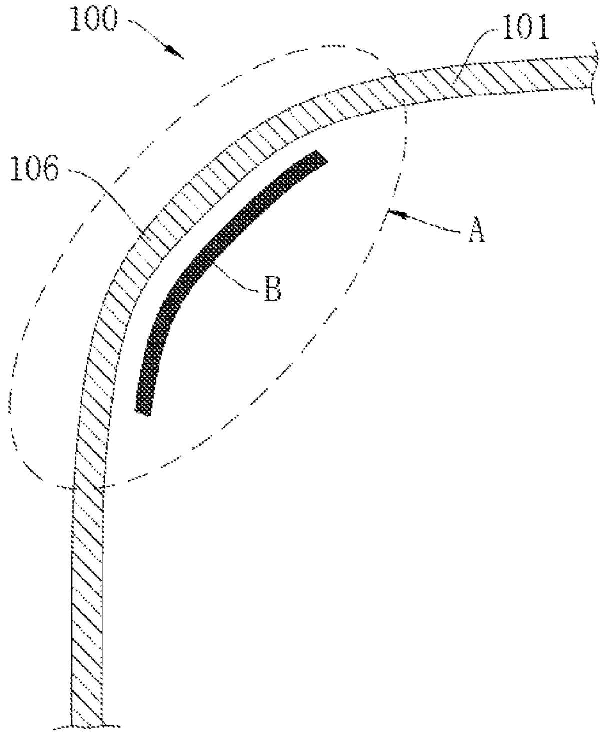
FIG. 3A is a schematic diagram of a positional relationship between a wave-absorbing material according to a first embodiment of the present disclosure and a shape abruptly-changed portion in the female connector illustrated in FIG. 1 or 2.
Figure 3B:
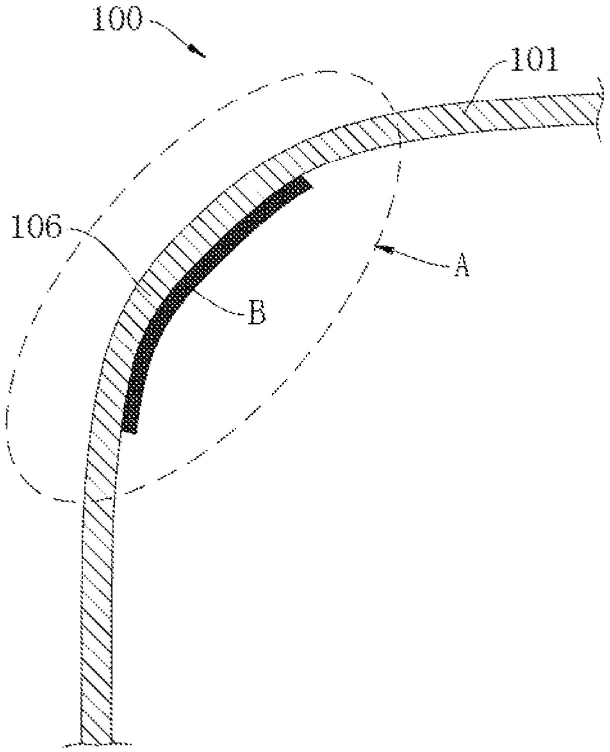
FIG. 3B is a schematic diagram of a positional relationship between a wave-absorbing material according to a second embodiment of the present disclosure and a shape abruptly-changed portion in the female connector illustrated in FIG. 1 or 2.
Figure 3C:
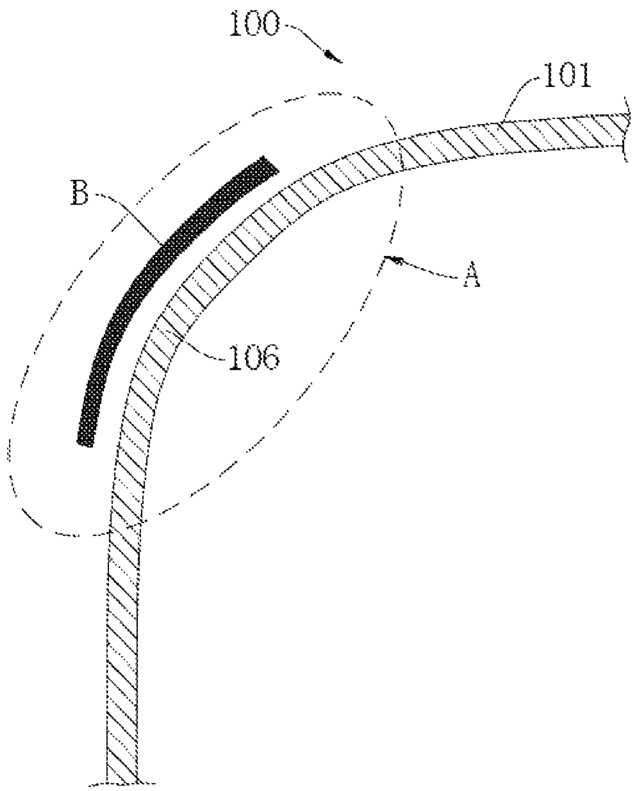
FIG. 3C is a schematic diagram of a positional relationship between a wave-absorbing material according to a third embodiment of the present disclosure and a shape abruptly-changed portion in the female connector illustrated in FIG. 1 or 2.
Figure 3D:
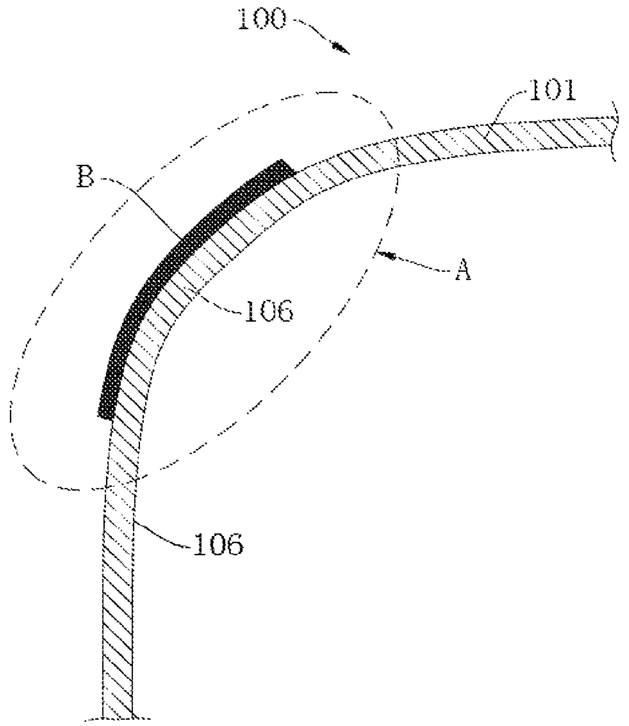
FIG. 3D is a schematic diagram of a positional relationship between a wave-absorbing material according to a fourth embodiment of the present disclosure and a shape abruptly-changed portion in the female connector illustrated in FIG. 1 or 2.
Figure 3E:
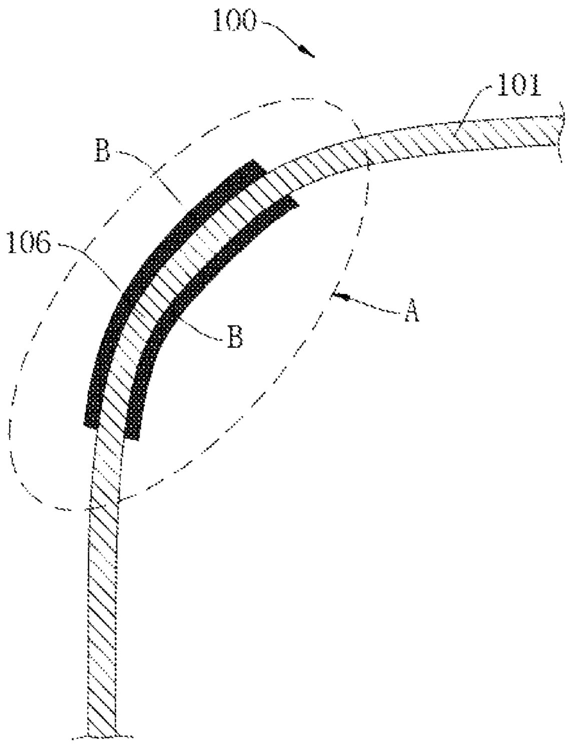
FIG. 3E is a schematic diagram of a positional relationship between a wave-absorbing material according to a fifth embodiment of the present disclosure and a shape abruptly-changed portion in the female connector illustrated in FIG. 1 or 2.
Figure 3F:
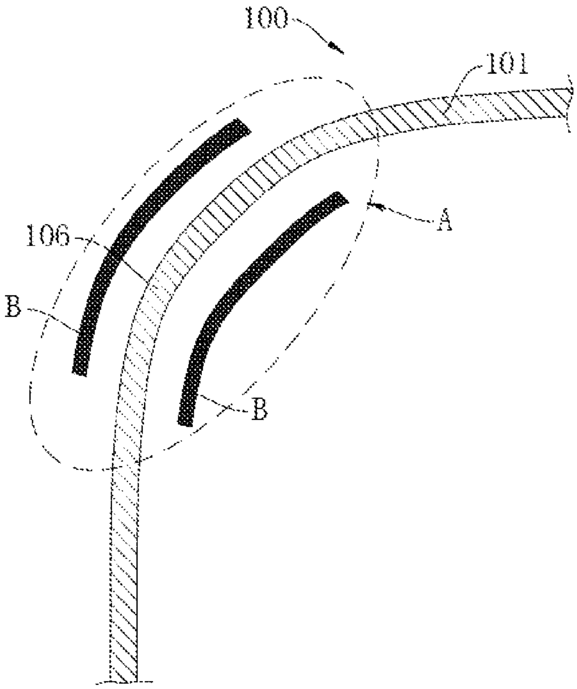
FIG. 3F is a schematic diagram of a positional relationship between a wave-absorbing material according to a sixth embodiment of the present disclosure and a shape abruptly-changed portion in the female connector illustrated in FIG. 1 or 2.
Figure 3G:
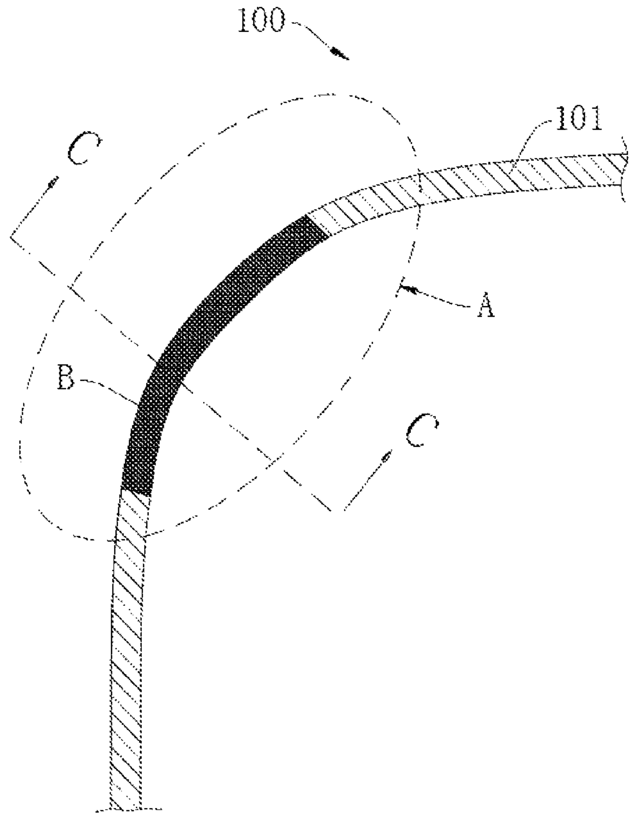
FIG. 3G is a schematic diagram of a positional relationship between a wave-absorbing material according to a seventh embodiment of the present disclosure and a shape abruptly-changed portion in the female connector illustrated in FIG. 1 or 2.
Figure 3G:
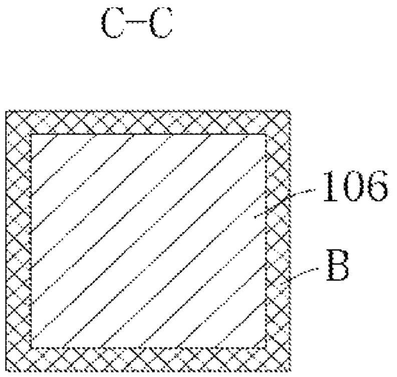

Described above is the embodiment where the wave-absorbing material B wraps the shape abruptly-changed portion 106, that is, the wave-absorbing material B is in contact with the surface of the shape abruptly-changed portion 106. In another feasible embodiment, the wave-absorbing material B is disposed on an outer wall of the shape abruptly-changed portion 106 and spaced apart from the surface thereof. That is, the wave-absorbing material B is disposed close to the shape abruptly-changed portion 106, without contacting the surface thereof. Specifically, still taking the case where the female terminal 101 is bent at the shape abruptly-changed portion 106 as an example, as illustrated in FIG. 3A, the wave-absorbing material B may be disposed inside the bent corner of the shape abruptly-changed portion 106 and spaced apart from the inner surface thereof. That is, the wave-absorbing material B is disposed inside the inner surface of the shape abruptly-changed portion 106. Alternatively, as illustrated in FIG. 3C, the wave-absorbing material B is disposed outside the bent corner of the shape abruptly-changed portion 106 and spaced apart from the outer surface thereof. That is, the wave-absorbing material B is disposed outside the outer surface of the shape abruptly-changed portion 106. Alternatively, as illustrated in FIG. 3F, the wave-absorbing material B is disposed both inside and outside the bent corner of the shape abruptly-changed portion 106, and spaced apart from the surfaces thereof. That is, the wave-absorbing material B is disposed both inside the inner surface and outside the outer surface of the shape abruptly-changed portion 106.

In this embodiment, the wave-absorbing material B may be fixedly supported by a plastic bracket which wraps the female terminal 101. That is, the wave-absorbing material B may be disposed on the plastic bracket, and is close to the shape abruptly-changed portion 106 while not contacting the surface thereof.

In this embodiment, the wave-absorbing material B may be in a solid form, such as block, plate, sheet, layer, strip and any other tangible physical shape, and the profile of its overall shape is adaptive to the profile of the inner surface or the outer surface of the shape abruptly-changed portion 106, so that the wave-absorbing material B can maximally cover or shield the shape abruptly-changed portion 106 to improve the wave-absorbing effect.

Further, a distance between the wave-absorbing material B and the surface of the shape abruptly-changed portion 106 may be set according to the actual situation, and it is not limited herein. For example, when the overall volume of the female connector 100 is large, i.e. the volume of the plastic bracket which wraps and fixes the female terminal 101 is large, the degree of freedom and the space for disposing the wave-absorbing material B is large, and the distance between the wave-absorbing material B and the surface of the shape abruptly-changed portion 106 may be large, such as 3 to 5 mm. On the contrary, when the overall volume of the female connector 100 is small, the distance between the wave-absorbing material B and the surface of the shape abruptly-changed portion 106 may be small, such as 1 to 3 mm.

Figure 3H:
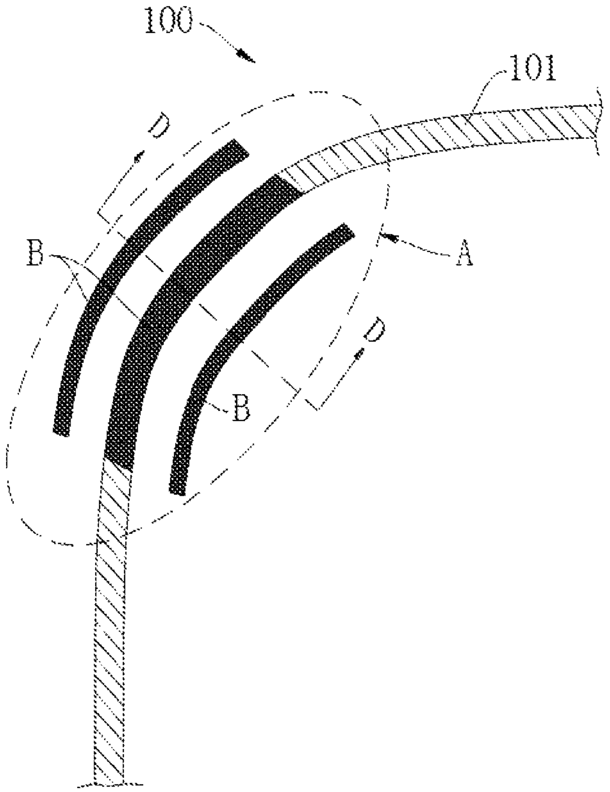
FIG. 3H is a schematic diagram of a positional relationship between a wave-absorbing material according to an eighth embodiment of the present disclosure and a shape abruptly-changed portion in the female connector illustrated in FIG. 1 or 2.
Figure 3H:
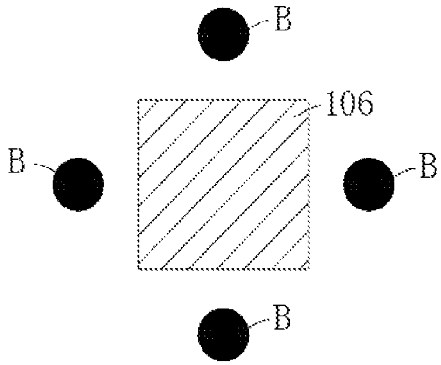
Figure 3I:
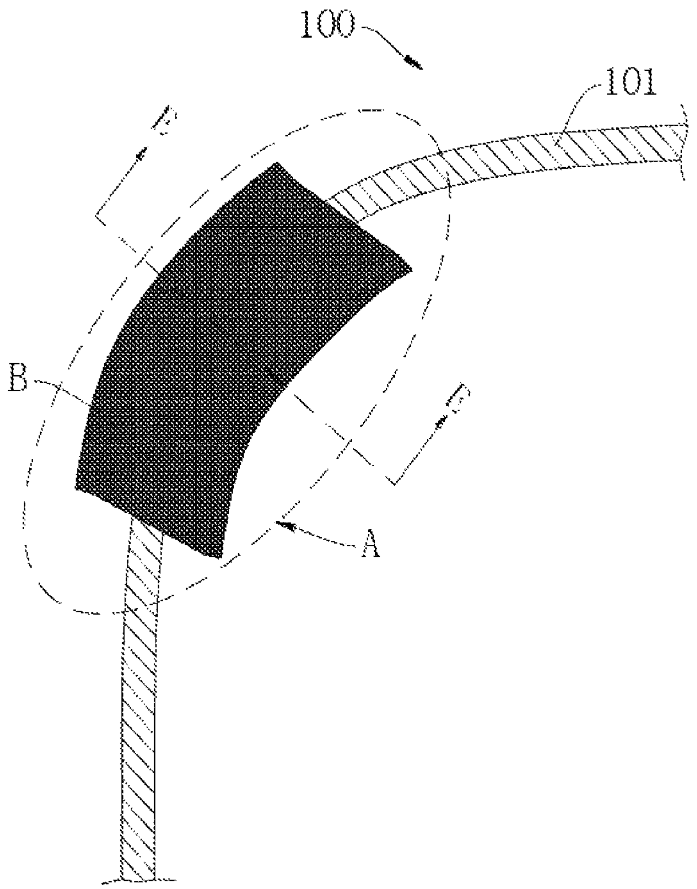
FIG. 3I is a schematic diagram of a positional relationship between a wave-absorbing material according to a ninth embodiment of the present disclosure and a shape abruptly-changed portion in the female connector illustrated in FIG. 1 or 2.
Figure 3I:
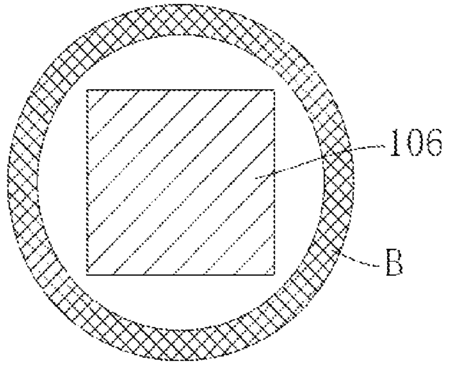

Similarly, described above is the embodiment where the wave-absorbing material B is located partially outside (inside the inner surface, outside the outer surface, inside the inner surface+outside the outer surface) the shape abruptly-changed portion 106. Of course, when the wave-absorbing material B is spaced apart from the shape abruptly-changed portion 106, the wave-absorbing material B may also be located on multiple sides of the shape abruptly-changed portion 106. As illustrated in FIGS. 3H and 3H', the wave-absorbing material B may be in a sheet-like or strip-like structure, with a shape adaptive to a profile of the surface of the shape abruptly-changed portion 106, and there may be a plurality of wave-absorbing materials B to surround the shape abruptly-changed portion 106. That is, taking FIG. 3H as an example, the wave-absorbing material B may be disposed on a front side, a rear side, a left side and a right side of the shape abruptly-changed portion 106. In which, 'front' and 'rear' are outward and inward directions perpendicular to the paper plane of FIG. 3H, respectively.

In this embodiment, the number of the wave-absorbing materials B in the sheet-like or strip-like structure may be set according to the actual situation, and for example may be 4, 5, 6 or more. The plurality of wave-absorbing materials B may be circumferentially arranged around the shape abruptly-changed portion 106 at uniform intervals. For example, as illustrated in FIG. 3H', the plurality of absorbing materials B may be arranged in an annular array around the shape abruptly-changed portion 106. Thereby, the plurality of wave-absorbing materials B are uniformly arranged around the shape abruptly-changed portion 106, so that the crosstalk signal can be uniformly absorbed.

In the above embodiment where the plurality of wave-absorbing materials B are circumferentially arranged around the shape abruptly-changed portion 106 at uniform intervals, the plurality of wave-absorbing materials B substantially enclose to form a hollowed-out cylindrical shape. That is, the wave-absorbing materials B distributed around the shape abruptly-changed portion 106 are circumferentially discontinuous. However, in the embodiments illustrated in FIGS. 3I and 3I', the wave-absorbing materials B are prepared in a circumferentially continuous cylindrical shape, and the cylindrical wave-absorbing materials B is disposed over the shape abruptly-changed portion 106 and is isolated from the outer surface thereof. Similarly, the profile of the wave-absorbing material B in the cylindrical shape is adaptive to the profile of the surface of the shape abruptly-changed portion 106, so that the wave-absorbing material B can be smoothly disposed over the shape abruptly-changed portion 106.

Figure 3J:
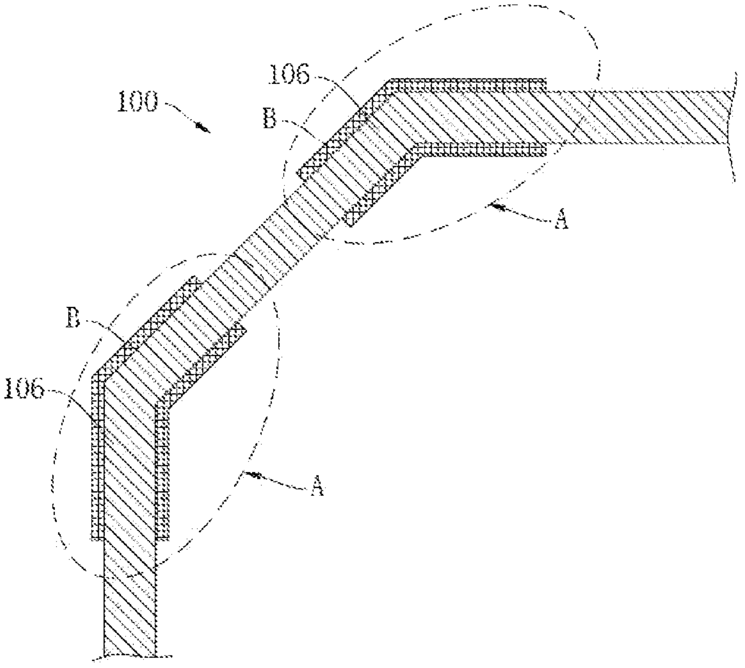
FIG. 3J is a schematic diagram of a positional relationship between a wave-absorbing material according to a tenth embodiment of the present disclosure and a shape abruptly-changed portion in the female connector illustrated in FIG. 1 or 2.
Figure 3K:
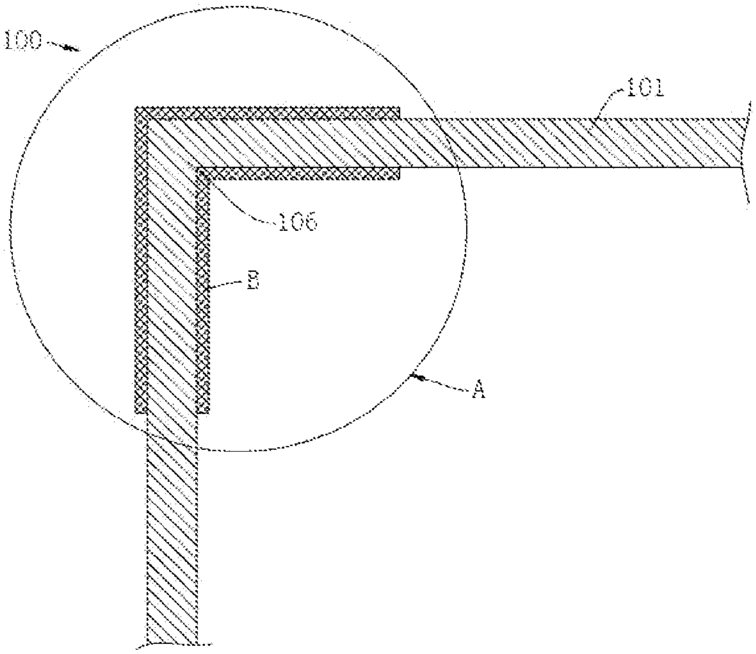
FIG. 3K is a schematic diagram of a positional relationship between a wave-absorbing material according to an eleventh embodiment of the present disclosure and a shape abruptly-changed portion in the female connector illustrated in FIG. 1 or 2.
Figure 3L:
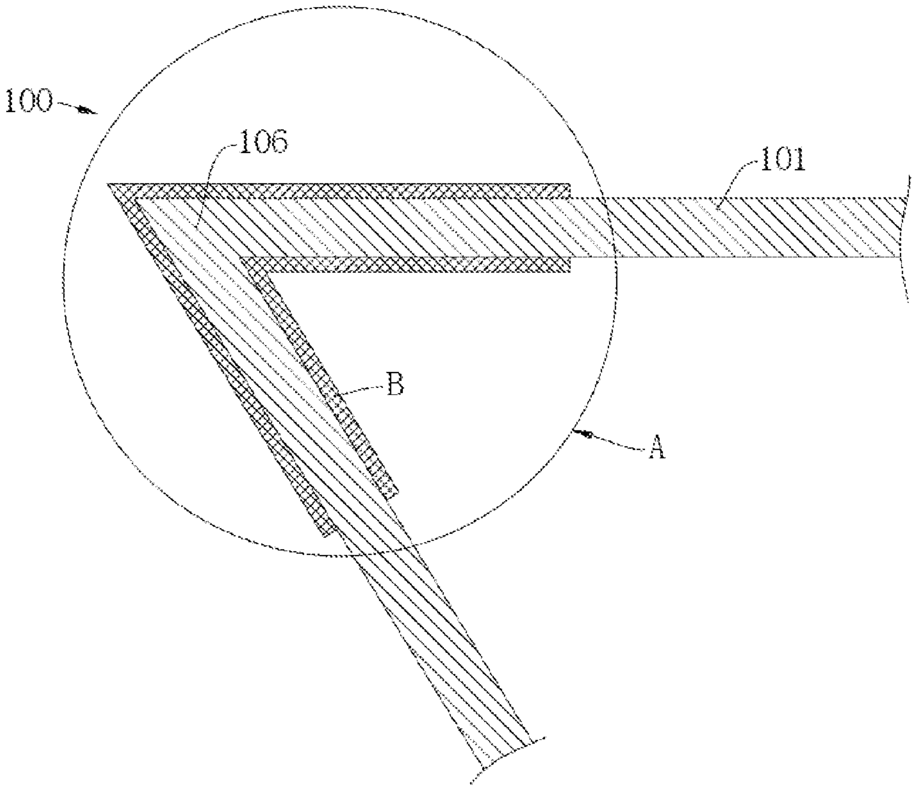
FIG. 3L is a schematic diagram of a positional relationship between a wave-absorbing material according to a twelfth embodiment of the present disclosure and a shape abruptly-changed portion in the female connector illustrated in FIG. 1 or 2.

In which, in the embodiments illustrated in FIGS. 3J to 3L with bending angles, the setting of the wave-absorbing materials B may also refer to the solutions of the above embodiments. For example, the wave-absorbing materials B may be disposed, in any suitable form listed above, on the inner and outer surfaces of the bent portion, on all of the outer surfaces of the bent portion, and outside the bent portion.

Following the above description, in another feasible embodiment, the wave-absorbing material B may be disposed on a plastic bracket (not illustrated). Specifically, the wave-absorbing material B is disposed close to the shape abruptly-changed portion 106, so as to be as close as possible to the high-frequency radiation source. The material form may be a coating layer, an adhesion layer or a film, or a solid form. As described above, when the material form is the coating layer, the adhesion layer or the film, the wave-absorbing material B may be disposed on the surface of the plastic bracket. When the material form is the solid form, such as block, plate, sheet and any other tangible physical shape, the wave-absorbing material B may be fixed on the plastic bracket in any suitable way, for example including but not limited to, snap-fit connection, mechanical fastener connection by bolts and other fastening structures, soldering by ultrasonic, solvent, laser, etc., hot melting, clamping, snap connection, hook connection and integrated fastening features.

Further, the plastic bracket may be accommodated in a shell. Thus, in another feasible embodiment, the wave-absorbing material B may be disposed on the shell (not illustrated). Specifically, the wave-absorbing material B is disposed close to the shape abruptly-changed portion 106. The material form may be a coating layer, an adhesion layer or a film, or a solid form. Please refer to the above description for detail, which will not be repeated herein.

In which, in the embodiment including the plastic bracket and the shell, the wave-absorbing material B may be disposed on the plastic bracket, or the shell, or both.

Of course, the above embodiments are merely a few feasible schematic solutions, rather than restrictive solutions. That is, the position and way for disposing the wave-absorbing material B and the material form thereof include but are not limited to the above embodiments. In other feasible embodiments, for example, when the wave-absorbing material B is prepared in the form of liquid, powder, plastic particles, etc., a suitable implementation process may be adopted according to actual demands, which is not limited herein.

It should be noted that the plastic bracket, shell, etc. included in the female connector 100 of the embodiment of the present disclosure may adopt any suitable existing configuration. In order to clearly and briefly explain the technical solution provided by this embodiment, the above parts will not be described in detail herein, and the drawings for the specification are also simplified accordingly. However, it should be understood that the embodiments of the present disclosure are not limited thereto in the spatial range.

Based on the same concept, an embodiment of the present disclosure further provides a connector combination formed by the mating of the female connector 100 and the male connector 200 or the gold finger circuit board 300 described in the above embodiments. Since the principle for the connector combination to solve problems and the technical effect that can be achieved are similar to those of the female connector 100, the implementation of the female connector 100 as described above may be referred to for the implementation of the connector combination, and the repeated content will be omitted here.

It should be noted that as an independent embodiment, the connector combination provided in the embodiment of the present disclosure may refer to the female connector 100 as described above, but should not be limited to the effect produced by the female connector 100.

FIG. 1 illustrates a structural schematic diagram of a connector combination formed by the mating of a male connector 200 and the female connector 100 described in the above embodiments. In which, the male connector 200 includes a male terminal 202 for mating with the female terminal 101. When the female terminal 101 is mated with the male terminal 202, a high-frequency radiation area A is formed in the vicinity of the shape abruptly-changed portion 106, and a wave-absorbing material B is disposed in a spatial range covered by the high-frequency radiation area A.

FIG. 2 illustrates a structural schematic diagram of a connector combination formed by the mating of a gold finger circuit board 300 and the female connector 100 described in the above embodiments. In which, the gold finger circuit board 300 has a gold finger insertion tip 301 inserted into the female terminal 101. When the female terminal 101 is mated with the gold finger insertion tip 301, a high-frequency radiation area A is formed in the vicinity of the shape abruptly-changed portion 106, and a wave-absorbing material B is disposed in a spatial range covered by the high-frequency radiation area A.

In the embodiments of the present disclosure, it is creatively discovered and found out that a high-frequency radiation area can easily occur due to an abrupt change of the shape of the female terminal 101 during the use of the connector, and practices show that the wave-absorbing material B only needs to be disposed in the high-frequency radiation area rather than areas without a high-frequency radiation. By selectively or pertinently disposing the wave-absorbing material B, signals are also selectively absorbed by the wave-absorbing material B. That is, only crosstalk signals are absorbed without affecting normal signals, so that the integrity of differential signals can be well ensured.

In addition, the way of selectively or pertinently disposing the wave-absorbing material B in the high-frequency radiation area is adopted to replace the way of entirely wrapping (a plastic bracket and a shell) with a wave-absorbing material B in the prior art, so as to overcome the signal crosstalk without using any additional shielding material, which not only greatly reduces the use amount of the wave-absorbing material B, as well as an overall weight and costs of consumables and process implementation of the connector, but also helps in improving the density of differential pairs, and meeting the application requirements of high-speed and high-density connectors in the current technical development.

Those described above are just a few embodiments of the present disclosure, and a person skilled in the art can make various changes or modifications to the embodiments of the present disclosure according to the content disclosed in the application document without departing from the spirit and scope of the present disclosure.

The invention claimed is:

1. A female connector comprising:

a female terminal having a first end for mating with a male connector or a gold finger circuit board, and a second end for connection with a PCB board, the female terminal being formed with at least one shape abruptly-changed portion between the first end and the second end, and a high-frequency radiation area being formed in the vicinity of the shape abruptly-changed portion when the first end is mated with the male connector or the gold finger circuit board; and a wave-absorbing material disposed in a spatial range covered by the high-frequency radiation area;

wherein the shape abruptly-changed portion includes a change of a cross-sectional area of the female terminal, the cross-sectional area being an area of a cross-section perpendicular to a signal flow direction in the female terminal, the change of the cross-sectional area includes: the cross-sectional area of the female terminal increasing or decreasing in a direction from the first end to the second end, a convex structure being formed on a surface of the female terminal, or a hole structure being formed in the female terminal.

2. The female connector according to claim 1, wherein the shape abruptly-changed portion includes at least one of:

bending of the female terminal; and a change of a cross-sectional area of the female terminal, the cross-sectional area being an area of a cross-section perpendicular to a signal flow direction in the female terminal.

3. The female connector according to claim 1, wherein the wave-absorbing material wraps at least part of an outer surface of the shape abruptly-changed portion.

4. The female connector according to claim 1, wherein the wave-absorbing material is disposed outside the shape abruptly-changed portion and is spaced apart from a surface thereof.

5. The female connector according to claim 4, wherein:

the wave-absorbing material has a sheet-like or strip-like structure, with a shape adaptive to a profile of the surface of the shape abruptly-changed portion; and a plurality of wave-absorbing materials surrounds the shape abruptly-changed portion.

6. The female connector according to claim 5, wherein a plurality of wave-absorbing materials is circumferentially distributed around the shape abruptly-changed portion at uniform intervals.

7. The female connector according to claim 1, wherein the wave-absorbing material is in a cylindrical shape, is disposed over the shape abruptly-changed portion, and is isolated from an outer surface thereof.

8. The female connector according to claim 1, wherein the wave-absorbing material is disposed on close to the shape abruptly-changed portion.

9. The female connector according to claim 1, wherein:

the wave-absorbing material has a sheet-like or strip-like structure, with a shape adaptive to a profile of the surface of the shape abruptly-changed portion; and a plurality of wave-absorbing materials surrounds the shape abruptly-changed portion.

10. A connector combination comprising a male connector and a female connector, wherein:

the male connector comprises a male terminal; and the female connector comprises:

a female terminal having a first end for mating with the male terminal and a second end for connection with a PCB board, the female terminal being formed with at least one shape abruptly-changed portion between the first end and the second end, and a high-frequency radiation area being formed in the vicinity of the shape abruptly-changed portion when the first end is mated with the male terminal; and a wave-absorbing material disposed in a spatial range covered by the high-frequency radiation area;

wherein the shape abruptly-changed portion includes a change of a cross-sectional area of the female terminal, the cross-sectional area being an area of a cross-section perpendicular to a signal flow direction in the female terminal, the change of the cross-sectional area includes: the cross-sectional area of the female terminal increasing or decreasing in a direction from the first end to the second end, a convex structure being formed on a surface of the female terminal, or a hole structure being formed in the female terminal.

11. The connector combination according to claim 10, wherein the shape abruptly-changed portion includes at least one of:

bending of the female terminal; and a change of a cross-sectional area of the female terminal, the cross-sectional area being an area of a cross-section perpendicular to a signal flow direction in the female terminal.

12. The connector combination according to claim 10, wherein:

the wave-absorbing material has a sheet-like or strip-like structure, with a shape adaptive to a profile of the surface of the shape abruptly-changed portion; and a plurality of wave-absorbing materials is circumferentially distributed around the shape abruptly-changed portion at uniform intervals.

13. The connector combination according to A connector combination comprising a male connector and a female connector, wherein:

the male connector comprises a male terminal; and the female connector comprises:

a female terminal having a first end for mating with the male terminal and a second end for connection with a PCB board, the female terminal being formed with at least one shape abruptly-changed portion between the first end and the second end, and a high-frequency radiation area being formed in the vicinity of the shape abruptly-changed portion when the first end is mated with the male terminal; and a wave-absorbing material disposed in a spatial range covered by the high-frequency radiation area;

wherein:

the wave-absorbing material wraps at least part of an outer surface of the shape abruptly-changed portion; and/or the wave-absorbing material is disposed outside the shape abruptly-changed portion and is spaced apart from a surface thereof; and/or the wave-absorbing material is in a cylindrical shape, is disposed over the shape abruptly-changed portion, and is isolated from an outer surface thereof; and/or the wave-absorbing material is disposed close to the shape abruptly-changed portion.

14. The connector combination according to claim 13, wherein the shape abruptly-changed portion includes a change of a cross-sectional area of the female terminal, the cross-sectional area being an area of a cross-section perpendicular to a signal flow direction in the female terminal, the change of the cross-sectional area includes: the cross-sectional area of the female terminal increasing or decreasing in a direction from the first end to the second end, a convex structure being formed on a surface of the female terminal, or a hole structure being formed in the female terminal.

15. A connector combination comprising a gold finger circuit board and a female connector, wherein:

the gold finger circuit board comprises a gold finger insertion tip; and the female connector comprises:

a female terminal having a first end for mating with the gold finger insertion tip and a second end for connection with a PCB board, the female terminal being formed with at least one shape abruptly-changed portion between the first end and the second end, and a high-frequency radiation area being formed in the vicinity of the shape abruptly-changed portion when the first end is mated with the gold finger insertion tip; and a wave-absorbing material disposed in a spatial range covered by the high-frequency radiation area;

wherein the shape abruptly-changed portion includes a change of a cross-sectional area of the female terminal, the cross-sectional area being an area of a cross-section perpendicular to a signal flow direction in the female terminal, the change of the cross-sectional area includes: the cross-sectional area of the female terminal increasing or decreasing in a direction from the first end to the second end, a convex structure being formed on a surface of the female terminal, or a hole structure being formed in the female terminal.

16. The connector combination according to claim 15, wherein the shape abruptly-changed portion includes at least one of:

bending of the female terminal; and a change of a cross-sectional area of the female terminal, the cross-sectional area being an area of a cross-section perpendicular to a signal flow direction in the female terminal.

17. The connector combination according to claim 15, wherein:

the wave-absorbing material has a sheet-like or strip-like structure, with a shape adaptive to a profile of the surface of the shape abruptly-changed portion; and a plurality of wave-absorbing materials is circumferentially distributed around the shape abruptly-changed portion at uniform intervals.

18. A connector combination comprising a gold finger circuit board and a female connector, wherein:

the gold finger circuit board comprises a gold finger insertion tip; and the female connector comprises:

a female terminal having a first end for mating with the gold finger insertion tip and a second end for connection with a PCB board, the female terminal being formed with at least one shape abruptly-changed portion between the first end and the second end, and a high-frequency radiation area being formed in the vicinity of the shape abruptly-changed portion when the first end is mated with the gold finger insertion tip; and a wave-absorbing material disposed in a spatial range covered by the high-frequency radiation area;

wherein:

the wave-absorbing material wraps at least part of an outer surface of the shape abruptly-changed portion; and/or the wave-absorbing material is disposed outside the shape abruptly-changed portion and is spaced apart from a surface thereof; and/or the wave-absorbing material is in a cylindrical shape, is disposed over the shape abruptly-changed portion, and is isolated from an outer surface thereof; and/or the wave-absorbing material is disposed close to the shape abruptly-changed portion.

19. The connector combination according to claim 18, wherein the shape abruptly-changed portion includes a change of a cross-sectional area of the female terminal, the cross-sectional area being an area of a cross-section perpendicular to a signal flow direction in the female terminal, the change of the cross-sectional area includes: the cross-sectional area of the female terminal increasing or decreasing in a direction from the first end to the second end, a convex structure being formed on a surface of the female terminal, or a hole structure being formed in the female terminal.

* * * * *